United States Patent [19]

Petta

[11] Patent Number: 4,669,696
[45] Date of Patent: Jun. 2, 1987

[54] LEVELLING SUPPORT STRUCTURE FOR VEHICLE MOUNTED REFRIGERATOR

[76] Inventor: John R. Petta, 820 E. Seventh Ave., Escondido, Calif. 92025

[21] Appl. No.: 740,025

[22] Filed: May 31, 1985

Related U.S. Application Data

[63] Continuation of Ser. No. 484,959, Apr. 14, 1983, abandoned.

[51] Int. Cl.⁴ ............................................ F16M 13/00
[52] U.S. Cl. .................................... 248/550; 248/656; 248/661; 248/188.3
[58] Field of Search ...................... 248/550, 656, 188.3, 248/660–663, 657, 651, 188.4, 181, 649, 650, 188.2, 346

[56] References Cited

U.S. PATENT DOCUMENTS 3,836,162  9/1974  Felkner ............................ 248/188.3
4,182,506  1/1980  Boveia ................................ 248/656

OTHER PUBLICATIONS

IBM Technical Disclosure Bulletin, vol. 19, 1-1977, J. A. Markovics.

Primary Examiner—Reinaldo P. Machado
Assistant Examiner—Alvin Chin-Shue
Attorney, Agent, or Firm—Baker, Maxham & Jester

[57] ABSTRACT

A mounting structure for a vehicle refrigerator includes a pivoting mounting structure for securely mounting the refrigerator to the body structure of the vehicle for pivotally moving about at least two axes which are parallel to the longitudinal and transverse axis respectively of the vehicle and includes a universal pivoting mount with electrically driven mechanical jacks operable in selected combinations for tilting the refrigerator body about a selected one of the horizontally oriented longitudinal or transverse axis of the vehicle or an axis in between.

7 Claims, 11 Drawing Figures

LEVELLING SUPPORT STRUCTURE FOR VEHICLE MOUNTED REFRIGERATOR

REFERENCE TO RELATED APPLICATIONS

The present application is a continuation of my copending application Ser. No. 484,959, filed Apr. 14, 1983, abandoned June 2, 1985.

BACKGROUND OF THE INVENTION

The present invention relates to refrigerator mounting apparatus and pertains particularly to levelling apparatus for levelling vehicle mounted refrigerators.

Many portable recreational vehicles have furnishings which include a refrigerator that makes the vehicle suitable for living quarters. Many of the refrigerators installed in such vehicles are the absorption-type utilizing a gas flame or electric heating element to heat the refrigerant such as a strong ammonia solution to cause it to boil. Heat and gravity supplies the circulating power for the refrigerant. The vaporized refrigerant circulates up through the condenser where it is charged to a liquid.

When the liquid ammonia passes through the freezing plate, it is again changed into a vapor by heat absorbed from the food and cabinet area. If the vapor is trapped or partially trapped by liquid ammonia, preventing it from passing out of the evaporator (or freezing plate) due to an unlevel condition, the result will be a total or partial loss of refrigeration.

This condition creates a necessity for maintaining the refrigerator level when the vehicle is stationary for proper operation. This requires levelling the refrigerator each time that the vehicle is parked or set up for overnight use.

The refrigerator in such vehicles is typically securely anchored to the floor or a wall of the vehicle chassis so that it will not move about during movement of the vehicle. The refrigerator is typically installed and adjusted to be level when the vehicle is level.

This mounting arrangement typically requires that the vehicle be levelled each time it is parked, so that the refrigerator will be level and function properly. Without the refrigerator levelled, the refrigerant within the coils will not properly flow within the refrigerator circuit. This requires that the vehicle be levelled, either by special jacks or by driving the vehicle onto blocks that must be carried and stored in the vehicle. Both of these approaches are not only time consuming, but are unpleasant tasks during severe weather conditions.

It is therefore desirable that improved apparatus be available for easily and conveniently levelling a refrigerator within a recreational vehicle.

SUMMARY AND OBJECTS OF THE INVENTION

It is the primary object of the present invention to provide improved means for levelling a vehicle mounted refrigerator.

In accordance with the primary aspect of the present invention, a refrigerator is mounted on a pivoting structure which is anchored to the chassis of the vehicle with a plurality of jacks for pivoting the entire refrigerator housing or chassis about generally horizontal axes, particularly including axes that are generally parallel to the longitudinal and transverse axis of the vehicle.

BRIEF DESCRIPTION OF THE DRAWINGS

The above and other objects and advantages of the present invention will become apparent from the following description when read in conjunction with the drawings wherein.

DETAILED DESCRIPTION OF PREFERRED EMBODIMENTS

Figure 1:
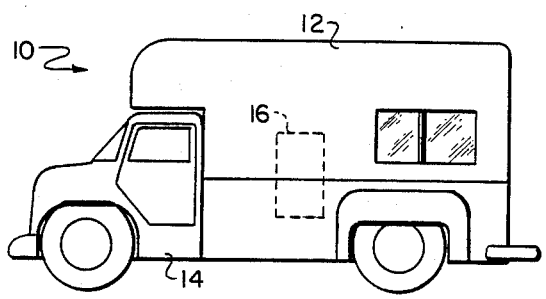
FIG. 1 illustrates a typical recreational vehicle with the refrigerator position indicated.

Referring to FIG. 1 of the drawing, a motorized recreational vehicle is illustrated and designated generally by the numeral 10 and includes a generally box-like living compartment or housing 12 mounted on a truck chassis 14. The box-like housing 12 is typically referred to as a camper shell and has provisions inside for overnight accommodations, including a refrigerator shown at a typical position 16 within the body or housing 12.

The refrigerator must be securely anchored within the interior of the camper shell and, for that reason, it will be level or not level, depending upon whether the camper shell 12 is level or not. It is obvious that the vehicle be positioned to head uphill or downhill with the front of the vehicle, either higher or lower than the rear, the refrigerator will be tilted to one side or the other, If, on the other hand, the vehicle is setting in a position such that one side is lower than the other, the refrigerator will be similarly tilted, either forward or backward. Also, if one tire is flat or the wheel in a hole, the vehicle will be tilted about an axis intermediate the pitch and roll axes. All of these situations present a situation such that the refrigerant fluid with the condenser coils will not flow freely within the system and the refrigerator will fail to function properly.

Figure 2:
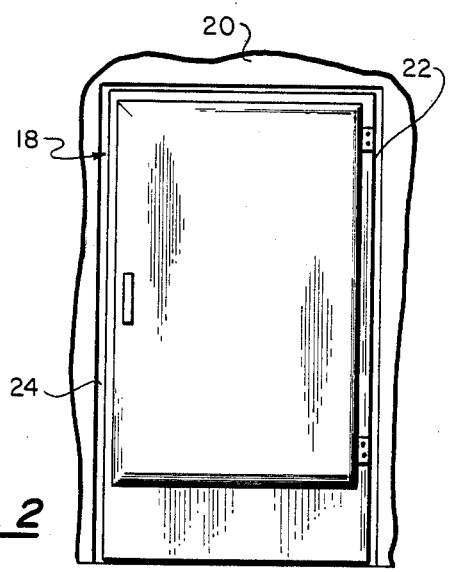
FIG. 2 is a front elevation view of the refrigerator shown positioned within cabinet structure within the vehicle.

Referring to FIG. 2, a typical refrigerator, designated generally by the numeral 18, is shown closely mounted within a generally box-like space formed by surrounding cabinet or wall structure 20. The refrigerator 18 includes a generally box-like housing 22 that fits within the generally box-like space formed by the cabinet structure 20. Sufficient space 24 is provided along the side walls of the refrigerator 22 and the top and bottom to enable pivoting of the refrigerator to level it under certain non-extreme tilting positions of the vehicle 10.

Figure 3:
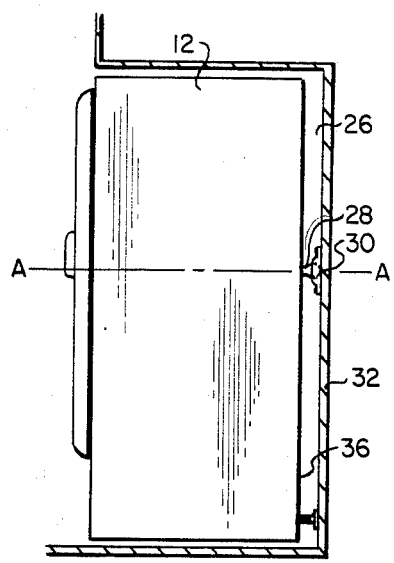
FIG. 3 is a side elevation view taken generally on line 3—3 of FIG. 2.

Referring to FIG. 3, sufficient space 26 is also provided at the rear of the refrigerator for accommodating the tilting of the refrigerator fore and aft.

Figure 4:
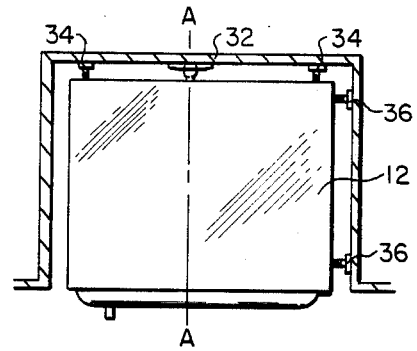
FIG. 4 is a top plan view taken generally on line 4—4 of FIG. 2.

In accordance with the present invention, a pivoting mounting structure, including a swivel mount, which in the illustrated embodiment comprises a ball and socket universal pivoting mount, with the ball member 28 connected directly to the chassis or housing of the refrigerator 22 and a socket structure 30 anchored directly to a wall panel or structure 32 of the camper shell 12. The positioning of the pivoting mount 28 and 30 approximately midway between the top and bottom of the refrigerator and approximately midway between the sides, as shown in FIG. 2, enables the obtaining of the maximum amount of pivoting accommodation within a given space, In the illustrated embodiment, the refrigerator 22 is positioned on the side of the wall of the camper shell and thereby must tilt to one side or the other to accommodate a pitch positioning of the vehicle and must tilt either forward or backwards to accommodate a roll positioning of the vehicle. More particularly, the mounting, as shown in FIGS. 3 and 4, provides for pivoting about a horizontal axis A—A through the support 28, 30 that is horizontal and parallel to the transverse or pitch axis of the vehicle. An axis B—B, as shown in FIG. 4, extends parallel to the longitudinal or roll axis of the vehicle and permits pivoting accommodation of the refrigerator about this axis.

In this embodiment, a plurality of screw jacks 34, disposed in pairs secured to the back wall 32 of the camper shell and to the back wall or back surface of the refrigerator 12, control pivoting of the refrigerator about the axis B—B. A similar set of jacks control pivoting of the refrigerator about the axis A—A. These jacks 34 and 36 also aid in securing the refrigerator in position to the walls of the camper shell of the vehicle. These jacks may be either electrically powered or manually powered, as desired. However, should manual operation be desired, access to the jacks must be provided. These jacks may be operated in any combination to pivot the refrigerator about the above referenced axes or any selected intermediate axis in between.

Figure 5:
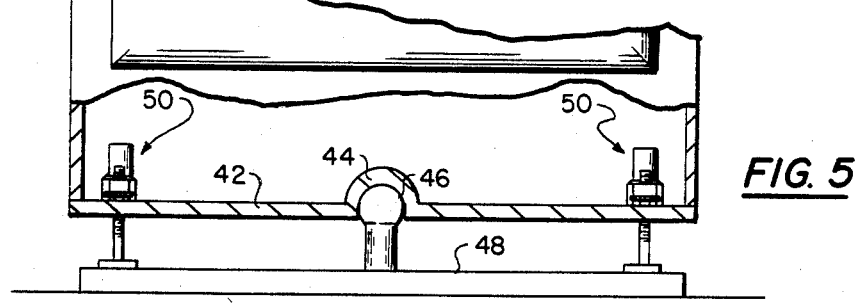
FIG. 5 is a front elevation view of an alternate embodiment of the mounting structure.
Figure 6:
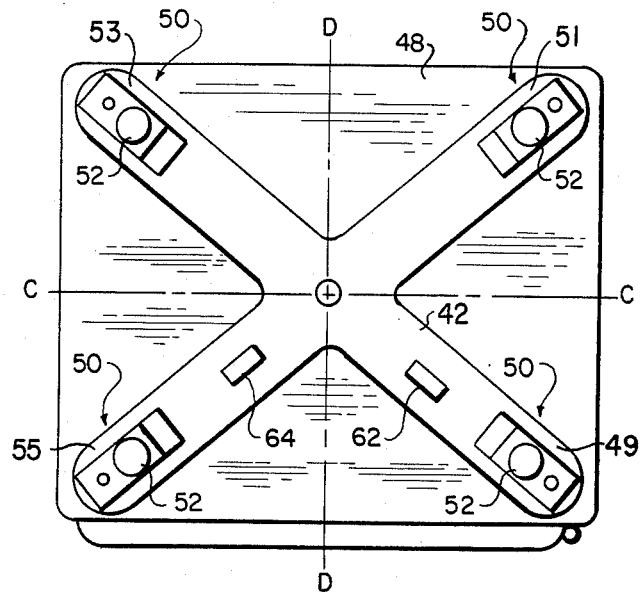
FIG. 6 is a top plan view of the mounting structure of FIG. 5

Referring to FIGS. 5 and 6, an alternate embodiment of the invention is illustrated wherein a refrigerator 40 is mounted directly on top of a pivoting support assembly, which comprises of a central generally cross-shaped support frame or plate 42, which includes a centrally positioned socket 44, which receives a ball member 46 anchored by a plate or the like 48 directly to the floor of the vehicle camper body structure. As best illustrated in FIG. 6, the support member 46 includes arms that extend outward and having ends 49, 51, 53, and 55 positioned at the four corners to the refrigerator and includes, at each corner (or arm end), a jack unit each of which is designated generally by the numeral 50. Other shapes of frame may be used.

Figure 7:
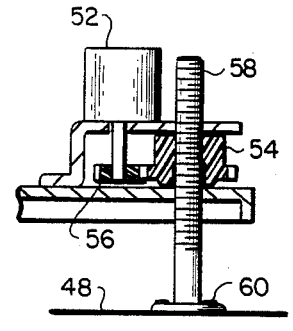
FIG. 7 is an enlarged detail view partially in section taken generally on line 7—7 of FIG. 6.
Figure 8:
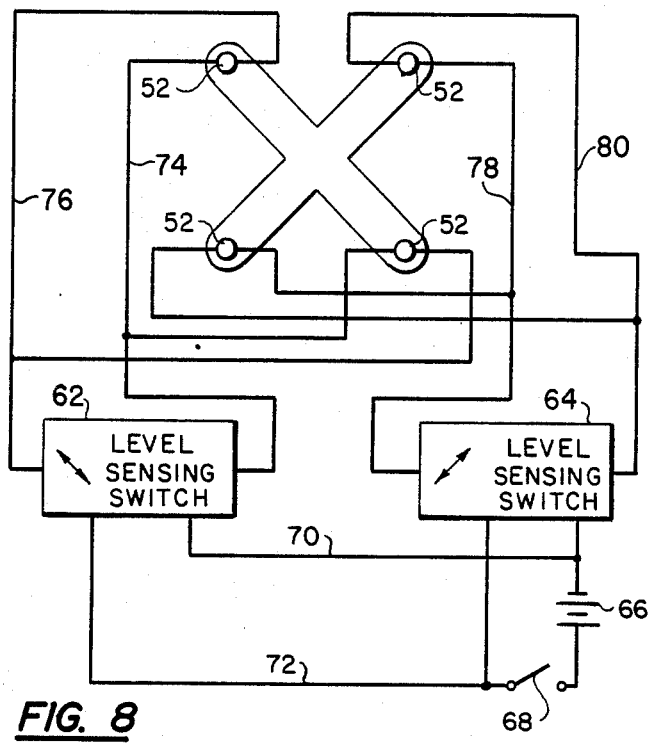
FIG. 8 is a schematic illustration of a control circuit for the embodiment of FIG. 5.

The details of the jack units, as best illustrated in FIG. 7, include an electric motor 52 driving a nut 54 through a gear train including a pinion 56. The nut 54 is threadably mounted on a screw 58, which is anchored by a foot portion member 60 directly to the floor structure 48. The motor 52 is reversible and controlled by a control circuit as illustrated in FIG. 8, which includes a pair of level sensing switches 62 and 64, which are positioned to be activated by certain non-level conditions. These switches are oriented and the circuit connected to drive the reversible motors 52 in pairs at diagonally opposite corners of the frame and refrigerator in a fashion to pivot the refrigerator about the universal support. The system is arranged to operate to pivot the frame in a manner to correspond with a pair of axes C—C and D—D that respectively correspond to, or is at least parallel to the roll axis and pitch axis respectively of the vehicle. The system will also function when a single one of the switches 62, 64 is activated to operate the motors at diagonally opposite ends 49, 53 or 51, 55 of the arms of the frame to pivot the frame (and refrigerator) about an axis that is intermediate the C—C and D—D axes. Accordingly, the refrigerator is automatically levelled upon activation of the levelling circuit.

Referring to FIG. 8, a typical levelling circuit is illustrated wherein a source of electrical power, such as the vehicle battery or the like 66, is connected in the circuit including a switch 68 with conductors 70 and 72 connecting the battery and switch to the level sensing switches 62 and 64. This figure is a schematic representation of FIG. 6 with the circuit included. The level sensing switches 62 and 64 are connected by pairs of conductors 74 and 76 and 78 and 80, respectively, to diagonally opposite pairs of the motors 52 for driving them in the appropriate direction to level the refrigerator relative to the vehicle. Each switch and its motors can operate independently of the other switch and its motors. For example, when a corner of the vehicle is high or low, one switch, e.g. 62, is activated which activates motors at arm ends 49 and 53, which would pivot the frame about an axis through the arm ends 51 and 55. This axis is intermediate the axes C—C and D—D. It is also obivous that both circuits can also operate simultaneously to pivot the frame about either axis C—C or D—D or an intermediate axis between these.

Figure 9:
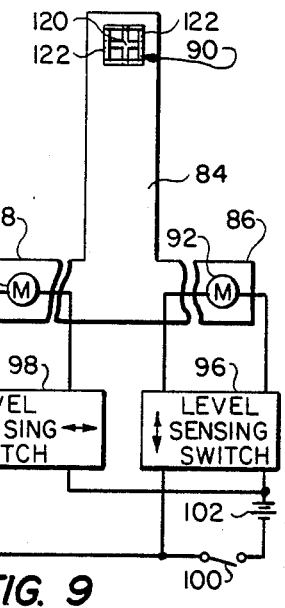
FIG. 9 is a top plan view of another embodiment of the mounting structure.

Referring to FIG. 9, an alternate embodiment of the support structure is illustrated for positioning beneath a refrigerator and comprises a generally T-shaped support member having a central elongated body member 84 and a pair of outwardly extending arms 86 and 88.

The support structure includes a pivot mount 90 at the outer end of the central body member 84 and a pair of jacks, such as electrical jacks 92 and 94, at the outer ends of each of the arms 86 and 88. The pivot mount 90 would be positioned beneath the back edge of the refrigerator and centrally between the side of the refrigerator. The jacks 92 and 94 would be positioned at the front corners of the refrigerator. A suitable electrical control system, including level sensing switches 96 and 98, are connected to or within the circuit connecting a source of power, such as a battery 102 to each of the motors of jacks 92 and 94. The level switches 96 and 98 respond to a non-level condition to close the circuits such that when the main switch 100 is closed, power from battery 102 is conducted to the motors 92 and 94 for levelling the refrigerator. For example, when switch 96 only is activated, both motors operate to either raise or lower the end of the frame. When only switch 98 is activated, both motors operate simultaneously to pivot the frame about the axis of arm 84. The support structure is secured directly to the bottom of the refrigerator and secured to the floor of the vehicle.

Figure 10:
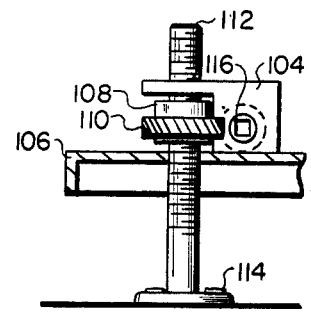
FIG. 10 is an elevation view of a mechanical jack for the embodiment of FIG. 9.

Referring now to FIG. 10, an alternate embodiment of a mechanically operated jack is illustrated. This jack includes a bracket 104 for securing directly to a support member 106. A nut 108, having gear teeth 110 on the outer periphery thereof, is threadably mounted on an elongated screw 112, which is secured by base 114 to the floor of the vehicle. A crank operated screw 116 is mounted within the bracket 104 and engages the teeth of the gear or nut 108. A crank handle is provided for rotation of the worm gear 116 which drives the nut gear 108 for causing it to move along the axis of the stationary screw 112, thereby tilting the support structure 106 for levelling the refrigerator.

Figure 11:
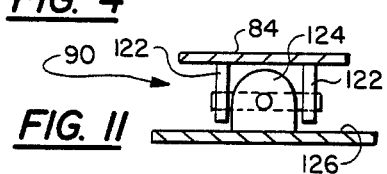
FIG. 11 is an elevation view of the pivot of the embodiment of FIG. 9.

Referring to FIGS. 9 and 11, the pivot 90 is a universal-type coupling, including a central cross pin 120 journaled along one pivot axis in brackets 122 mounted on central body member 84 and journaled along another pivot axis in brackets 124 secured to a floor mount plate or bracket 126. This pivot bracket 90 may also be utilized in place of any of the ball and socket pivot mounts.

In operation, when the recreational vehicle has parked for the evening and it is desired that the refrigerator operate, the switch 68 is activated, which automatically activates the circuit if the sensing switches 62 and 64 are activated by a non-level condition of the refrigerator support structure. Upon activation of one or both of the circuits, the appropriate pair of the jack motors 52 will be driven in either the forward or reverse direction to raise and lower the respective pairs of arms 49-53 and 51-55 to level the refrigerator.

Numerous modification can be made in the structure and operation of the apparatus within the scope of the appended claims. For example, the jacks may be manually actuated with appropriate level indicating means to secure levelling of the refrigerator. Also, the full four corner supports of the embodiment, illustrated in FIGS. 5, 6 and 8, can eliminate the central universal support joint 44, 46 as desired since the unit can be totally and fully supported on the four separate jacks. However, the central universal joint does have the advantage of a more secure support of the refrigerator. Other modifications and structures will become obvious from the present invention without departing from the spirit and scope of the invention as defined in the appended claims.

Having now described my invention, I claim:

1. A levelling support apparatus for levelling a refrigerator or the like in a vehicle, said apparatus comprising:
    a support plate for supporting a refrigerator, a supporting surface, a single universal pivot means on said supporting surface attached to said plate directly beneath the center thereof in alignment with the center axis of said plate for supporting said plate and said refrigerator supported thereon for pivotal movement about substantially orthogonal horizontal first and second axes which are respectively generally parallel to the pitch and roll axes of the vehicle for levelling said plate and said refrigerator supported thereon independently of the vehicle;
    first and second power means each including a pair of levelling devices and each disposed on opposite sides of both of said first and second axes supporting the periphery of said plate on said supporting surface, a pair of levelling sensing means each operatively associated with a respective pair of said levelling devices, said first and second power means being operative simultaneously for pivoting said plate and said refrigerator supported thereon about a selected one of said first and second axes; and
    said first and second power means being operative independently for pivoting said plate and said refrigerator supported thereon about an axis intermediate said first and second axes.

2. The levelling support apparatus of claim 1 wherein said first and second power means comprises a jack secured to said frame means underneath each corner of said refrigerator and secured to the floor of said vehicle, said jacks being operative in pairs disposed at diagonally opposite corners of said refrigerator.

3. The levelling support apparatus of claim 2 wherein said jacks are screw jacks.

4. The levelling support apparatus of claim 3 wherein said jacks are electrically powered.

5. The levelling support apparatus of claim 4 wherein said jacks are powered by an electrical circuit including levelling sensing switches.

6. The levelling apparatus of claim 3 wherein said screw jacks are powered by electrical motors.

7. The levelling apparatus of claim 6 wherein said electrical motors are powered by circuit means including first second level sensing switches.

* * * * *